US012619176B2

(12) United States Patent
Nedelin et al.

(10) Patent No.: US 12,619,176 B2
(45) Date of Patent: May 5, 2026

(54) IMAGE TRANSFER FOR LIQUID ELECTRO-PHOTOGRAPHIC PRINTING

(71) Applicant: Hewlett-Packard Development Company, L.P., Spring, TX (US)

(72) Inventors: Peter Nedelin, Nes Ziona (IL); Mark Sandler, Nes Ziona (IL)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 0 days.

(21) Appl. No.: 18/703,176

(22) PCT Filed: Oct. 22, 2021

(86) PCT No.: PCT/US2021/056246

§ 371 (c)(1),
(2) Date: Apr. 19, 2024

(87) PCT Pub. No.: WO2023/069115

PCT Pub. Date: Apr. 27, 2023

(65) Prior Publication Data

US 2024/0419105 A1 Dec. 19, 2024

(51) Int. Cl.

| | |
|---|---|
| ***G03G 15/16*** | (2006.01) |
| ***G03G 15/01*** | (2006.01) |
| ***G03G 15/10*** | (2006.01) |
| ***G03G 15/20*** | (2006.01) |

(52) U.S. Cl.

CPC ....... *G03G 15/161* (2013.01); *G03G 15/0131* (2013.01); *G03G 15/0189* (2013.01); *G03G 15/10* (2013.01); *G03G 15/169* (2013.01); *G03G 15/2021* (2013.01)

(58) Field of Classification Search

CPC ........... G03G 15/10–11; G03G 15/161; G03G 15/1665; G03G 15/167; G03G 15/169; G03G 15/2021; G03G 15/24; G03G 2215/0626; G03G 2215/0629; G03G 13/10; G03G 13/11

See application file for complete search history.

(56) References Cited

U.S. PATENT DOCUMENTS 5,765,084 A * 6/1998 Asada ................ G03G 15/1605 399/302
6,067,907 A 5/2000 Iwamoto et al.
6,141,026 A * 10/2000 Domoto ............... G03G 15/104 399/251
6,269,233 B1 7/2001 Yamaguchi
(Continued)

FOREIGN PATENT DOCUMENTS

| | | | |
|---|---|---|---|
| CN | 102112562 | A | 6/2011 |
| EP | 0244198 | A2 | 11/1987 |
| WO | 2021/105806 | A1 | 6/2021 |

*Primary Examiner* — Carla J Therrien
(74) *Attorney, Agent, or Firm* — Jordan IP Law, LLC

(57) ABSTRACT

In one example, an LEP printer includes a belt rotatable in a loop, a series of multiple printing units along the belt each to apply an LEP ink color separation to the belt, a first heater to dry the color separations on the belt to a molten film at a drying temperature, a second heater to heat the molten film on the belt to a transfer temperature higher than the drying temperature, and a pressure roller near the belt to press a printable substrate against the belt at a nip between the pressure roller and the belt.

13 Claims, 5 Drawing Sheets

(56) References Cited

U.S. PATENT DOCUMENTS

| | | | | |
|---|---|---|---|---|
| 8,038,281 | B2 | 10/2011 | Kwong et al. | |
| 8,350,879 | B2 | 1/2013 | Larson et al. | |
| 9,327,498 | B1 | 5/2016 | Mantell | |
| 9,885,983 | B2 | 2/2018 | Prinsen | |
| 10,576,734 | B2 | 3/2020 | Landa et al. | |
| 2005/0025534 | A1* | 2/2005 | Fujita | G03G 15/1665 399/307 |
| 2009/0035458 | A1* | 2/2009 | Yoshie | G03G 15/11 399/249 |
| 2009/0311440 | A1 | 12/2009 | Li et al. | |
| 2011/0236821 | A1* | 9/2011 | Kageyama | G03G 15/201 430/124.1 |
| 2015/0097906 | A1 | 4/2015 | Beier et al. | |
| 2015/0268603 | A1* | 9/2015 | Yokoyama | G03G 15/10 399/251 |
| 2016/0077477 | A1* | 3/2016 | Hidaka | G03G 15/2053 399/336 |
| 2018/0129151 | A1 | 5/2018 | Nedelin et al. | |
| 2019/0358982 | A1 | 11/2019 | Landa et al. | |
| 2019/0361377 | A1 | 11/2019 | Sandler et al. | |
| 2020/0050132 | A1* | 2/2020 | Nedelin | G03G 15/5066 |

* cited by examiner

IMAGE TRANSFER FOR LIQUID ELECTRO-PHOTOGRAPHIC PRINTING

BACKGROUND

Liquid electro-photographic (LEP) printing uses a special kind of ink to form images on paper and other printable substrates. LEP ink contains tiny pigments encapsulated in a polymer resin, forming particles that are dispersed in a carrier liquid. The polymer particles are sometimes referred to as toner particles and, accordingly, LEP ink is sometimes called liquid toner. In an LEP printing process, an electrostatic pattern of the desired printed image is formed on a photoconductor for each color of the image. Each color is developed by applying a thin layer of LEP ink to the photoconductor. Charged polymer particles in the ink adhere to the electrostatic pattern on the photoconductor to form the desired pattern of liquid ink for that color. Each color pattern is commonly referred to as a "separation." Each liquid ink color separation is transferred from a photoconductor to an intermediate transfer member, heated to dry the ink and melt the polymer particles, and pressed on to the cooler substrate as a molten film and "frozen" in place at a nip between the intermediate transfer member and a pressure roller.

In some LEP printing processes, each color separation is transferred individually from the intermediate transfer member to the substrate sequentially one after another to form the printed image. In other LEP printing processes, the color separations are gathered together on the intermediate transfer member sequentially one after another and then transferred as a group from the intermediate transfer member to the substrate to form the printed image.

DRAWINGS

The same part numbers refer to the same or similar parts throughout the figures. The figures are not necessarily to scale.

DESCRIPTION

Figure 1:
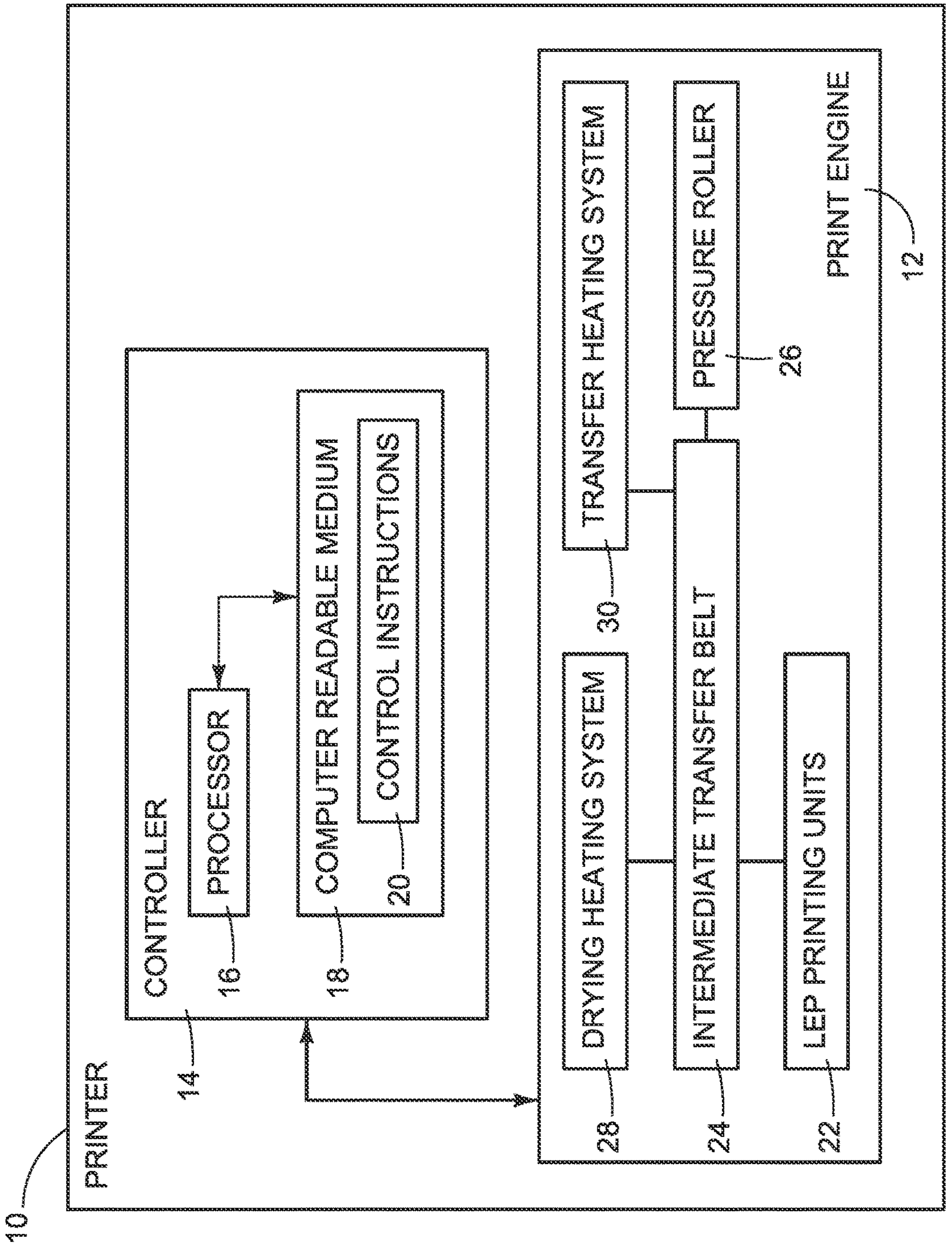
FIG. 1 illustrates one example of an LEP printer in which the heating functions for ink drying and film transfer are divided between two heating systems.

In some LEP printers, the intermediate transfer member is a belt that rotates in an endless loop past a series of printing units. Each printing unit applies a liquid ink color separation to the surface of the rotating belt to form a liquid ink image on the belt. The belt is heated to dry the liquid ink image to a molten film. The molten film is transferred from the belt to the print substrate at a nip between the belt and a pressure roller. Infrared lamps are commonly used to heat the intermediate transfer belt to dry the ink and to keep the molten film hot to the point of transfer. The best temperature for drying the ink is often less than the best temperature for transferring the molten film to the print substrate. In addition, the temperature of the belt may be lower to prevent over-drying the molten film, for example on longer belts used for printing with six colors of ink. If the temperature of the molten film is too low at the point of transfer, as is often the case, a primer is applied to the substrate to improve adhesion, thus increasing the cost of the substrate and shrinking the universe of usable substrates.

A new technique has been developed to add flexibility to LEP transfer belt processes by dividing the heating functions for ink drying and film transfer between two heating systems. In an example, the LEP printing process includes rotating an intermediate transfer belt in a loop, gathering multiple LEP ink color separations together on the rotating belt, drying the color separations to a molten film, and then, just before transferring the molten film to the print substrate, heating the molten film to a transfer temperature much higher than the drying temperature. For example, a series of IR lamps along the rotating belt heat the liquid ink color separations to 90° C.-110° C. to dry the ink to a molten film. The drying time and/or heating intensity may be varied depending on the density of the color separations that make up the ink image, for example by turning on or off some of the lamps. Once the ink dries to a molten film, any remaining dryer lamps along the belt are turned off. Then, just before the point of transfer, a laser, LED array, or other suitable high intensity focused heater rapidly heats the molten film to a tacky transfer temperature of 120° C. (or more).

A separate, higher intensity heating system near the point of transfer may be optimized for transfer heating without compromising ink drying, for example with higher, more effective transfer temperatures. With a higher intensity heating system near the point of transfer, the drying heating system no longer has to maintain the molten film at an acceptable, but lower and less effective, transfer temperature. A separate, lower intensity heating system for drying the ink may be optimized for drying without compromising transfer heating, for example with lower temperatures, shorter drying times, and/or to prevent over-drying the molten film.

These and other examples shown in the figures and described herein illustrate but do not limit the scope of the patent, which is defined in the Claims following this Description.

As used in this document "and/or" means one or more of the connected things; a "computer readable medium" means any non-transitory tangible medium that can embody, contain, store, or maintain programming for use by a computer processor and may include, for example, circuits, integrated circuits, ASICs, hard drives, random access memory (RAM), and read-only memory (ROM); and "LEP ink" means a liquid that includes polymer particles in a carrier liquid suitable for electro-photographic printing.

FIG. 1 illustrates one example of an LEP printer 10 in which the heating functions for ink drying and film transfer are divided between two heating systems. Referring to FIG. 1, printer 10 includes a print engine 12 and a controller 14 operatively connected to print engine 12. Controller 14 includes the programming, processing and associated memory resources, and the other electronic circuitry and components to control the operative elements of printer 10. Controller 14 in FIG. 1 includes a processor 16 and a computer readable medium 18 with control instructions 20 operatively connected to processor 16. Controller 14 may include distinct control elements for individual systems and components of printer 10, including print engine 12. Although print engine 12 and controller 14 are shown in different blocks in FIG. 1, some of the control elements of controller 14 may reside with print engine 12, for example close to the print engine components they control.

Print engine 12 in FIG. 1 includes LEP printing units 22, an intermediate transfer belt 24, and a pressure roller 26. Belt 24 rotates in a loop past printing units 22 and pressure roller 26. Each printing unit 22 applies an LEP ink color separation to the rotating belt 24. A drying heating system 28 heats the color separations to a drying temperature to dry the color separations to a molten film. A transfer heating system 30 heats the molten film to a transfer temperature higher than the drying temperature. The pressure roller 26 presses a paper or other printable substrate against the rotating belt 24 to transfer the molten film from the belt to the substrate.

Drying heating system 28 may include multiple IR lamps commonly used in LEP belt printers, or other suitable lower intensity heaters, positioned along belt 24 to maintain uniform heating long enough for the liquid ink to dry to a molten film. The use of multiple heaters for drying also allows controller 14 executing control instructions 20 to vary the drying time by turning heaters on and off, for example to dry more and less dense color separations. Transfer heating system 30 includes a laser or other suitable higher intensity heater(s) that heat the molten film very rapidly to the desired transfer temperature just before the film is transferred to the print substrate. The laser(s) may be turned on and off in bursts or their intensity adjusted to achieve the desired transfer temperatures for more or less dense films. As noted above, printer controller 14 may include distinct control elements for individual printer systems including, for example, a system controller for each heating system 28, 30. "Lower" and "higher" in this context refer to the relative intensity of the heaters in the two heating systems, not to an absolute range or threshold.

Figure 2:
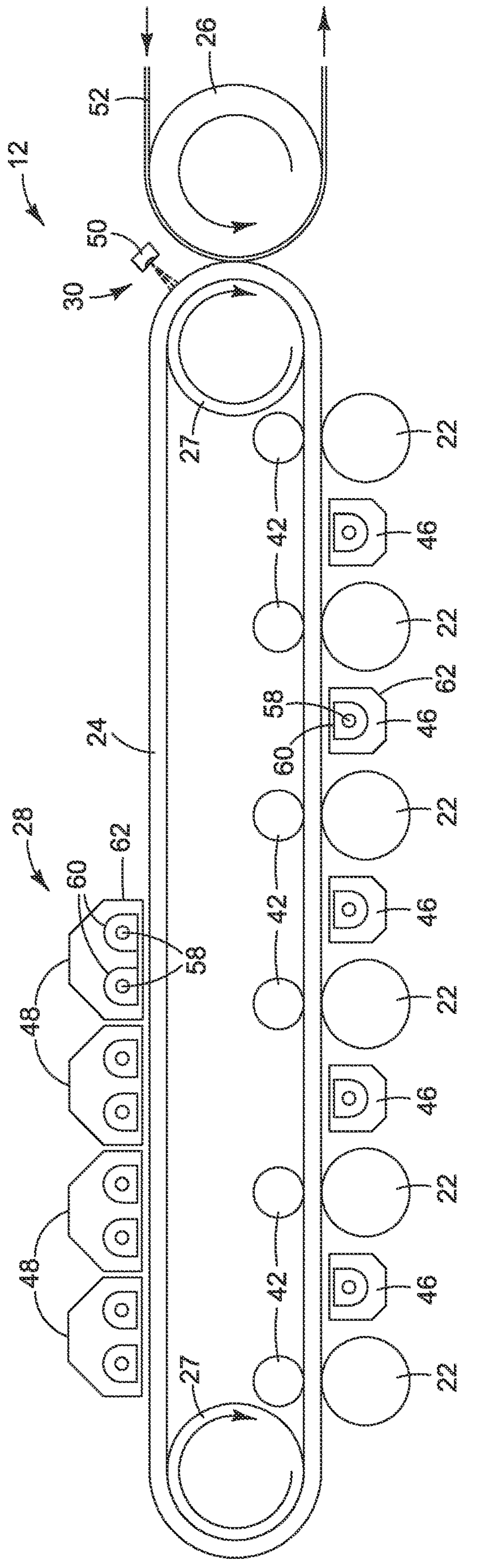
FIGS. 2-6 illustrate one example of an LEP print engine such as might be implemented in the printer shown in FIG. 1.

FIGS. 2-6 illustrate one example of an LEP print engine 12 such as might be implemented in a printer 10 shown in FIG. 1. Referring to FIG. 2, print engine 12 includes multiple LEP printing units 22, an intermediate transfer belt 24, and a pressure roller 26. Although six printing units 22 are shown for six color separations, more or fewer printing units 22 could be used for more or fewer color separations. Belt 24 rotates in a loop around rollers 27 past printing units 22 and pressure roller 26. Each printing unit 22 applies an LEP ink color separation to the rotating belt 24. The color separations are gathered together on belt 24 as a full color ink image.

Figure 5:
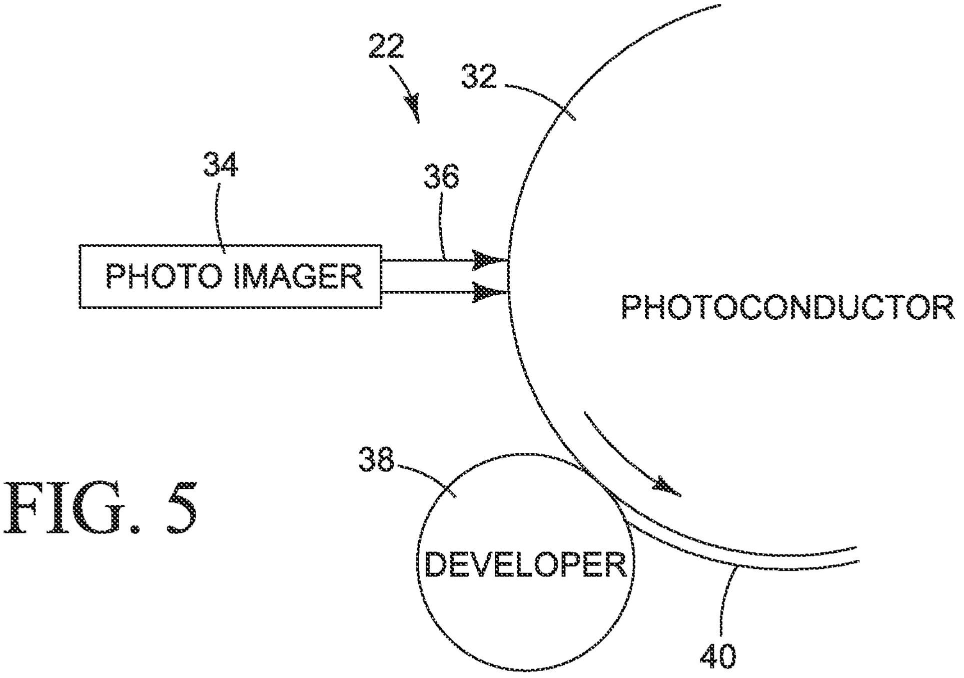
Figure 6:
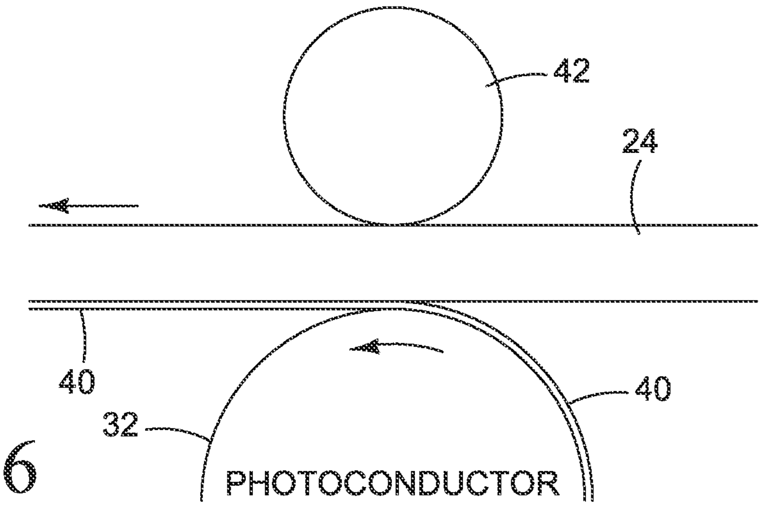

FIG. 5 illustrates an example printing unit 22. Referring to FIG. 5, each printing unit 22 includes a photoconductor 32, a scanning laser or other suitable photo imaging device 34, and a developer 38. Laser 34 exposes select areas on photoconductor 32 to light 36 to form a charge pattern on photoconductor 32 corresponding to the respective color separation. Developer 38 applies a thin layer of LEP ink to the patterned photoconductor 32. Ink from developer 38 adheres to the charge pattern on photoconductor 32 to develop a color separation 40 on photoconductor 32. Each liquid ink color separation 40 is transferred from photoconductor 32 to intermediate transfer belt 24 as shown in FIG. 6. In this example, print engine 12 includes an idler roller 42 opposite each printing unit 22 to help keep belt 24 properly positioned with respect to the corresponding photoconductor 32.

Figure 3:
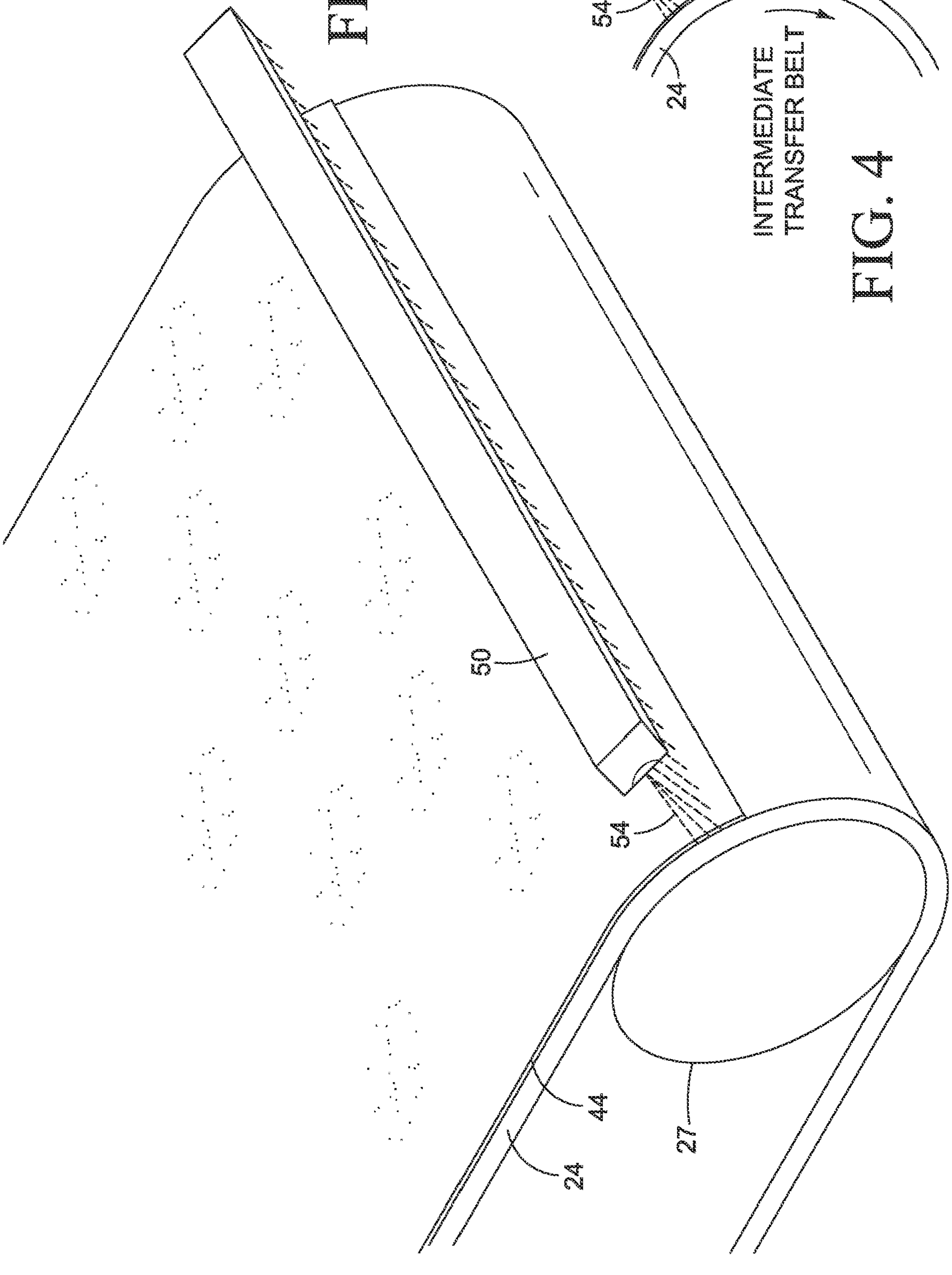
Figure 4:
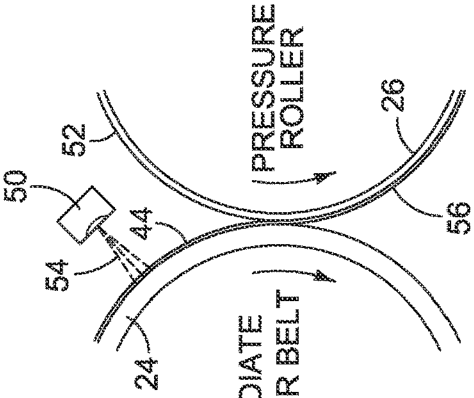

Referring to FIGS. 2-4, the color separations on belt 24 are dried to a molten film 44 by a series of heaters 46, 48 in a drying heating system 28. Molten film 44 is shown in FIGS. 3 and 4. Transfer heating system 30 includes a transfer heater 50 that heats molten film 44 rapidly to the desired transfer temperature just before the point of transfer to printable substrate 52 to form a printed image 56 on substrate 52, as shown in FIG. 4. Heaters 46, 48 in system 28 heat the color separations to a drying temperature to dry the color separations to a molten film. Heater 50 in system 30 heats the molten film to a transfer temperature higher than the drying temperature.

IR lamps commonly used in LEP belt printers or other suitable lower intensity heaters may be used for each drying heaters 46, 48. In the example shown in FIG. 2, each heater 46 includes an IR lamp 58, a reflector 60 to concentrate the light from lamp 58 toward belt 24, and a ventilation hood 62 to contain and evacuate vapors produced while drying the ink. Each heater 48 includes two lamps 58 and reflectors 60 within a single ventilation hood 62. Also, in this example, each heater 46 is positioned along belt 24 between a pair of adjacent printing units 22 to dry the ink separation by separation and inhibit the "back-transfer" of ink from the belt to the next printing unit.

An intermediate transfer belt 24 usually includes a replaceable "blanket" covering a core. The comparatively soft, compliant blanket that carries the ink color separations is heated to the drying temperature, 90° C.-110° C. for example, by heaters 46, 48. The drying temperature is maintained along belt 24 for the desired drying time. The drying time and/or temperature may be varied depending on the density of the color separations that make up the ink image, for example by turning on or off some of the heaters 48 (or some of the lamps 58 in multi-lamp heaters 48). Once the ink dries to the desired molten film, heating of the film may be stopped, for example by turning off some of the heaters 48 along the upper run of belt 24. Because print engine 12 includes a separate, downstream heating system 30 to heat the molten film to the desired transfer temperature, above 120° C. for example, drying heating system 28 does not need to keep the molten ink hot all the way to the point of transfer. Accordingly, more or fewer heaters 48 may be used to optimize drying without compromising the transfer temperature.

In one example, transfer heater 50 is implemented as an array of lasers spanning the width of belt 24 as shown in FIG. 3. The lasers usually will be assembled together in a control module or light bar operatively connected to controller 14 (FIG. 1). The high power density of the light beams 54 enables fast and focused heating of belt 24. The surface of belt 24 carrying molten film 44 is heated rapidly to the desired transfer temperature along a narrow band just before molten film 44 is pressed on to substrate 52 at the nip with pressure roller 26, as best seen in FIG. 4. The molten film is heated primarily by conduction from the outer part of belt 24 which has a high absorption coefficient at the laser wavelengths. In one specific example, transfer heater 50 is configured as a single row of VCSELs (Vertical Cavity Surface-Emitting Lasers) emitting light beams 54 at a wavelength of 808 nm-980n m. The VCSEL module has a maximum output power of 12.5 W/mm of printing width with a power density up to 1.6 W/mm$^2$.

Belt blankets currently used in LEP belt printers absorb light across a wide band of wavelengths and, thus, may be used with a VCSEL type heater 50. In this example, belt 24 was exposed to beams 54 for 2-3 ms with the post-heating time varied between 20 ms-30 ms (the time between exposure to beams 54 and contact with print substrate 52). Other suitable configurations for transfer heater 50 are possible. For one example, other types of lasers or even non-laser, narrowly focused heat sources may be used for heater 50. The power of each laser and/or the size of the array may be varied to achieve the desired heating characteristics. Also, the wavelength of light beams 54 and the absorption characteristics of the blanket on belt 24 may be tuned to one another to help improve both the effectiveness and the efficiency of heater 50 while maintaining the desired drying characteristics of drying heating system 28.

While the characteristics of heater 50 may vary depending on the particular printing application, it is expected that a heater 50 delivering a heat energy greater than 3.2 $mJ/mm^2$ will be adequate to achieve the desired transfer temperature in the range of 120° C.-160° C., raising the temperature of the molten film 30° C. or more in less than 3 ms. In one example, a molten film 44 in FIGS. 3 and 4 reaches transfer heating 50 at about 90° C. and is heated to above a threshold tacky transfer temperature of 120° C. in less than 3 ms.

Figure 7:
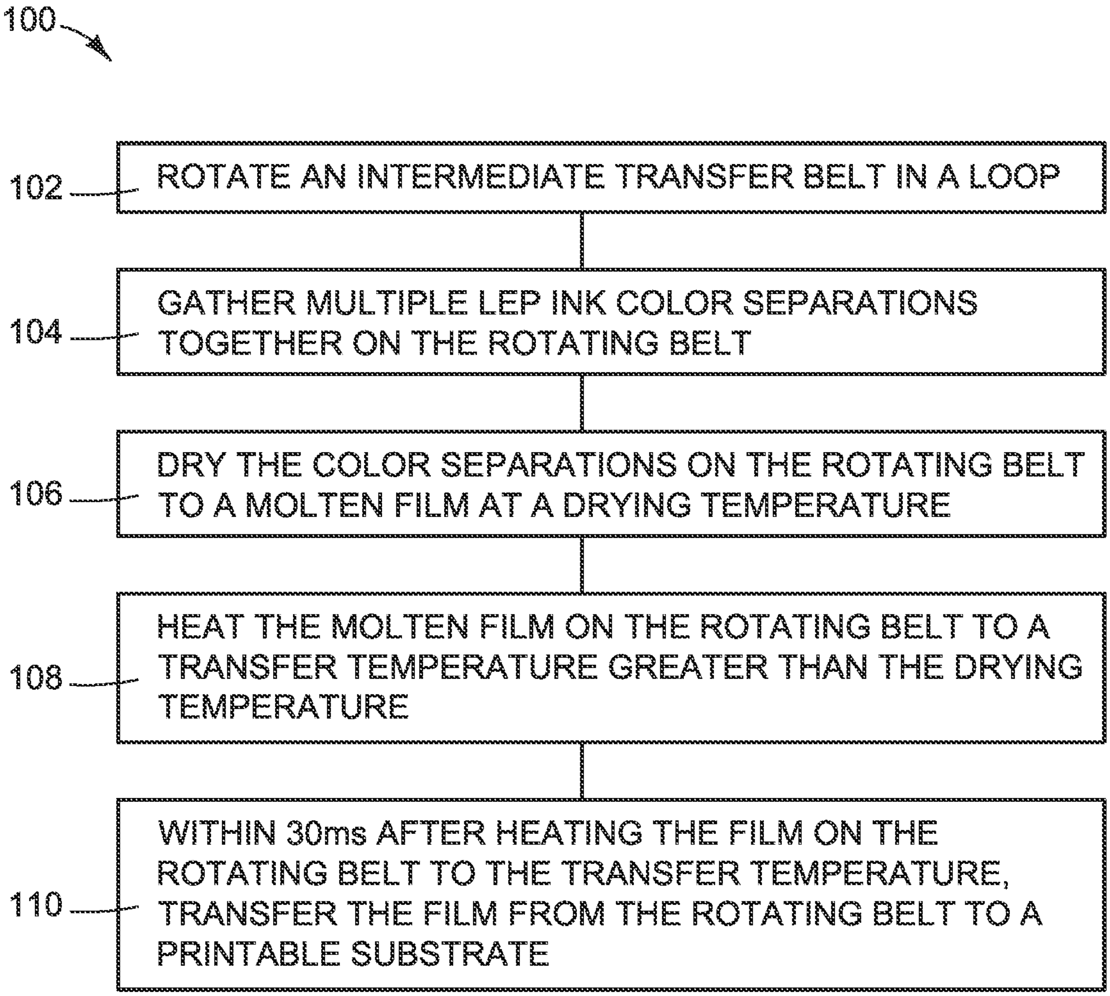
FIG. 7 illustrates one example of an LEP printing process in which the film transfer temperature is higher than the ink drying temperature.

FIG. 7 is a flow diagram illustrating one example of an LEP printing process 100 such as might be implemented by a controller 14 executing instructions 20 in a printer 10 shown in FIG. 1. Referring to FIG. 7, process 100 includes rotating an intermediate transfer belt in a loop (block 102) and, during a single rotation of the belt loop, gathering multiple LEP ink color separations together on the rotating belt (block 104), drying the color separations on the rotating belt to a molten film at a drying temperature (block 106), heating the molten film on the rotating belt to a transfer temperature higher than the drying temperature (block 108), and, within 30 ms after heating the film on the rotating belt to the transfer temperature, transferring the film from the rotating belt to a printable substrate (block 110). In one example, the color separations are dried at block 106 by heating the color separations to a drying temperature of 90° C.-110° C. with a lower intensity heater and the molten film is heated to a transfer temperature of at least 120° C. with a higher intensity heater.

As noted above, these and other examples shown in the figures and described herein illustrate but do not limit the scope of the patent, which is defined in the following Claims.

"A" and "an" in the Claims means one or more. For example, a heater means one or more heaters and subsequent reference to the heater means the one or more heaters.

The invention claimed is:

1. An LEP printer comprising:

a belt rotatable in a loop;

a series of multiple LEP printing units along the belt each to apply an LEP ink color separation to the belt;

a first heater to dry the color separations on the belt to a molten film at a drying temperature;

a second heater to heat the molten film on the belt to a transfer temperature higher than the drying temperature by a beam of light having an exposure time of 2 to 3 milliseconds; and a pressure roller near the belt to press a printable substrate against the belt at a nip between the pressure roller and the belt, wherein the second heater is located before the pressure roller.

2. The printer of claim 1, wherein:

the first heater comprises a series of multiple first heaters along the belt, each first heater having a first intensity; and the second heater comprises a laser having a second intensity greater than the first intensity.

3. The printer of claim 2, wherein the second heater is located along the belt such that, when the belt is rotating, the molten film enters the nip within 30 ms after the second heater heats the molten film to the transfer temperature.

4. The printer of claim 3, wherein the second intensity is at least 1.0 $W/mm^2$.

5. The printer of claim 4, wherein:

the drying temperature is 90° C.-110° C.; and the transfer temperature is 120° C.-160° C.

6. The printer of claim 5, wherein:

one or more of the first heaters is located between each pair of adjacent printing units; and one or more of the first heaters is located downstream from all of the printing units.

7. An LEP printer, comprising:

a belt rotatable in a loop;

a series of multiple printing units along the belt each to apply an LEP ink color separation to the belt;

a series of multiple first heaters along the belt, each first heater having a first intensity to dry the color separations on the belt to a molten film at a drying temperature;

a second heater having a second intensity greater than the first intensity to heat the molten film on the belt to a transfer temperature higher than the drying temperature;

a pressure roller near the belt to press a printable substrate against the belt at a nip between the pressure roller and the belt; and a controller programmed to: rotate the belt; and turn off some of the first heaters based on a density of the color separations on the belt.

8. The printer of claim 7, wherein:

one or more of the first heaters is located between each pair of adjacent printing units; and one or more of the first heaters is located downstream from all of the printing units.

9. The printer of claim 7, wherein the second heater is located along the belt such that the molten film enters the nip within 30 ms after the second heater heats the molten film to the transfer temperature.

10. The printer of claim 7, wherein the second intensity is at least 1.0 $W/mm^2$.

11. An LEP printing process, comprising:

rotating an intermediate transfer belt in a loop; and during a single rotation of the belt loop:

gathering multiple LEP ink color separations together on the rotating belt;

drying the color separations on the rotating belt to a molten film at a drying temperature;

then heating the molten film on the rotating belt to a transfer temperature greater than the drying temperature by a beam of light having an exposure time of 2 to 3 milliseconds; and within 30 ms after heating the film on the rotating belt to the transfer temperature, transferring the film from the rotating belt to a printable substrate, wherein the heating is performed at a location on the intermediate transfer belt before the transferring.

12. The process of claim 11, wherein:

drying the color separations comprises heating the color separations with a first heater having a first intensity; and heating the molten film comprises heating the molten film with a second heater comprising a laser having a second intensity greater than the first intensity.

13. The process of claim 12, wherein:

heating the color separations comprises heating the color separations to 90° C.-110° C.; and heating the molten film comprises heating the molten film to 120° C.-160° C.

* * * * *